United States Patent
Huang et al.

(10) Patent No.: US 9,462,507 B2
(45) Date of Patent: Oct. 4, 2016

(54) LOAD BALANCING METHOD AND SYSTEM FOR MULTI-BAND NETWORK

(75) Inventors: Baiqiu Huang, Shenzhen (CN); Yu Liu, Shenzhen (CN); Jun Feng, Shenzhen (CN); Chao Yao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 74 days.

(21) Appl. No.: 14/382,412

(22) PCT Filed: Jun. 29, 2012

(86) PCT No.: PCT/CN2012/077902
§ 371 (c)(1),
(2), (4) Date: Sep. 2, 2014

(87) PCT Pub. No.: WO2013/127142
PCT Pub. Date: Sep. 6, 2013

(65) Prior Publication Data
US 2015/0131441 A1    May 14, 2015

(30) Foreign Application Priority Data
Mar. 2, 2012    (CN) .......................... 2012 1 0054872

(51) Int. Cl.
*H04W 28/08*    (2009.01)
*H04W 16/08*    (2009.01)
(Continued)

(52) U.S. Cl.
CPC ............. *H04W 28/08* (2013.01); *H04W 16/08* (2013.01); *H04W 48/06* (2013.01); *H04W 76/048* (2013.01)

(58) Field of Classification Search
CPC ... H04L 47/10; H04L 47/2441; H04L 47/30; H04L 47/32; H04L 12/5693
See application file for complete search history.

(56) References Cited

U.S. PATENT DOCUMENTS

| 7,577,453 B2 | 8/2009 | Matta | |
| 2006/0166677 A1* | 7/2006 | Derakshan | H04W 36/14 455/453 |
| 2007/0087757 A1* | 4/2007 | Core | H04W 48/18 455/453 |

(Continued)

FOREIGN PATENT DOCUMENTS

| CN | 101137223 A | 3/2008 |
| CN | 101772173 A | 7/2010 |

(Continued)

OTHER PUBLICATIONS

International Search Report in international application No. PCT/CN2012/077902, mailed on Dec. 13, 2012. (2 pages—see entire document).

(Continued)

*Primary Examiner* — Mark Rinehart
*Assistant Examiner* — Sanjay K Dewan
(74) *Attorney, Agent, or Firm* — Oppedahl Patent Law Firm LLC (57) ABSTRACT

A load balancing method and system is provided. When a terminal enters an idle, access or service state, and a base station determines that the terminal is in a multi-band covering section, load conditions of the bands in the section are recorded; and when determining that a preset idle or access or service state condition is met based on the recorded load conditions of the bands in the section, the base station performs load balancing control on the terminal. For the terminal in the idle, access or service state, load balancing for a multi-band network can be implemented.

16 Claims, 1 Drawing Sheet

(51) Int. Cl.
*H04W 76/04* (2009.01)
*H04W 48/06* (2009.01)

(56) References Cited

U.S. PATENT DOCUMENTS

2007/0110021 A1    5/2007   Naik
2007/0281711 A1*  12/2007   Matta ...................... H04L 47/10
                                                                455/453
2009/0323530 A1*  12/2009   Trigui ................. H04L 41/5025
                                                                370/235
2013/0077490 A1*   3/2013   Sela ..................... H04B 7/1858
                                                                370/235
2015/0131441 A1*   5/2015   Huang .................. H04W 28/08
                                                                370/235

FOREIGN PATENT DOCUMENTS

CN    102075999 A    5/2011
CN    102111812 A    6/2011

OTHER PUBLICATIONS

English Translation of the Written Opinion of the International Search Authority in international application No. PCT/CN2012/077902, mailed on Dec. 13, 2012. (14 pages—see entire document).

\* cited by examiner

LOAD BALANCING METHOD AND SYSTEM FOR MULTI-BAND NETWORK

TECHNICAL FIELD

The disclosure relates to Code Division Multiple Access (CDMA) technologies, and in particular, to a load balancing method and system for a multi-band network.

BACKGROUND

In a CDMA mobile communication system, available frequency resources are divided into several bands and each band is in turn divided into several frequency points. In the system, each carrier frequency corresponds to a particular band and frequency point. At the time when mobile communication had not been fully developed, because of a small number of users, usually a single band deployed by an operator could meet communication requirements. However, since the single band could just provide a limited capacity, as the number of users increases, the single band cannot fully meet requirements of the users, the operator must deploy more bands to accommodate more users.

In a multi-carrier mobile communication system, regardless of whether carrier frequencies belong to a same band, load balance between the carrier frequencies must be considered. If traffic is concentrated in one or more of the carrier frequencies, this will inevitably lead to heavier load on some of the carrier frequencies, which affects functionalities of the service or quality of the communication, and even damages devices, while idle carrier frequencies are not fully utilized, resulting in a waste of resources.

In a CDMA system, a base station issues a CDMA Channel List Message to terminals in an idle state. The message contains information of some or all frequency points in all carrier frequencies at a current band deployed by the system. Each terminal calculates its own standby frequency point by using a HASH algorithm based on its International Mobile Subscriber Identification Number (IMSI). The HASH algorithm can make the number of standby terminals on each frequency point almost as same as each other. Balancing among the numbers of standby terminals in the idle state can bring an service state balancing to a certain extent, and thus in the whole, the load on each carrier band among a same band can be balanced substantially.

However, this balancing method cannot be applied to a network in which a plurality of bands are deployed, because the CDMA channel list message does not carry band information. The terminals perform the HASH algorithm just in the band in which the CDMA channel list message is received and on the frequency points listed in the message. Therefore, there is no way to balance the loads among the bands.

Chinese patent application No. 200710077248.8, entitled "一种基站，多频段网络中 的频段负荷的调整 方法及系统 (Base Station, Method and System for Adjusting Band Loads in Multi-band Network)" proposes a method to solve the problem of load imbalance among the bands. In the patent, a global redirect message is used to adjust numbers of standby terminals in various bands, in order to implement inter-band load balance. However, this method also has the following disadvantages: first, just a balancing method for terminals in the idle state is provided, while balancing in other states is not mentioned, and thus it is a limited method; and second, the global redirect message depends merely on Access Overload Class of the terminal to determine the band for the standby terminal, and thus only a single adjusting approach is employed.

U.S. patent application No. US2007110021, entitled "Method and system for directing a call for a mobile station to a band class in a wireless communication network" provides a method of adjusting band loads by assigning a traffic channel across bands. When a terminal accesses the network, if there is a heavy load in the accessed band, the base station indicates the terminal to jump to another band with lighter load to establish a call, such that the loads in different bands can be adjusted. However, this method only provides an inter-band balancing method for terminals in an access state, but does not provide a balancing method in other states, and thus also has a great limitation.

SUMMARY

In view of this, a load balancing method and system for a multi-band network is provided, such that for the terminal in the idle, access or service state, load balancing for a multi-band network can be implemented.

The technical solutions according to the embodiments of the disclosure are provided are as follows.

In an embodiment, a load balancing method and system is provided, which includes when a terminal enters an idle, access or service state, and a base station determines that the terminal is in a multi-band covering section, recording load conditions of the bands in the section; and when determining that a preset idle or access or service state condition is met based on the recorded load conditions of the bands in the section, the base station performs load balancing control on the terminal.

Preferably, the recorded load conditions of the bands in the section comprises load conditions of source bands and target bands on which load balancing control is performed.

Preferably, the load conditions of source bands comprises at least instant load $$L_a = \frac{\sum_{m=1}^{M_a} P_{am}^{cur}}{\sum_{m=1}^{M_a} P_{am}^{max}}$$

of the source band $B_a$, where $1 \leq a \leq N$, N denotes a number of bands deployed in the section and is a positive integer; $P_{am}^{cur}$ denotes a current forward transmit power at $f_{am}$; $P_{am}^{max}$ denotes a rated forward transmit power at $f_{am}$; $f_{am}$ is a $m^{th}$ carrier frequency in $B_a$, $1 \leq m \leq M_a$; $M_a$ denotes the number of carrier frequencies deployed in $B_a$; the load conditions of target bands comprises at least instant load $$L_t = \frac{\sum_{m=1}^{M_t} P_{tm}^{cur}}{\sum_{m=1}^{M_t} P_{tm}^{max}}$$

of the target bands $B_t$, where $P_{tm}^{cur}$ denotes a current forward transmit power at $f_{tm}$; $P_{tm}^{max}$ denotes a rated forward transmit power at $f_{tm}$; $f_{tm}$ is a $m^{th}$ carrier frequency in band $B_t$, $1 \leq m \leq M_t$; $M_t$ denotes a number of carrier frequencies deployed in band $B_t$, and is a positive integer.

Preferably, in the case that the terminal enters the idle state, when determining that the preset idle state condition is met based on the recorded load conditions of the bands in the section, performing, by the base station, load balancing control on the terminal, comprises: when determining that the source band is not as same as the target band, the instant load of the source band is larger than a preset load threshold of the source band, and the instant load of the target band is smaller than a preset load threshold of the target band, performing load balancing control on the terminal.

Preferably, the load threshold of the source band is larger than the load threshold of the target band; and determining that the source band is not as same as the target band comprises: determining that the target band is $B_t$ based on the source band $B_a$, where $$t = \operatorname*{argmin}_{a} L_a;$$

and when $t \neq a$, determining that the source band is not as same as the target band.

Preferably, the preforming load balancing control on the terminal comprises: transmitting, by the base station, a service redirection message, which carries a list of carrier frequencies of the source and target bands, to the terminal; after receiving the service redirection message, sequentially selecting each carrier frequency in the list, until successfully entering a system at a selected carrier frequency.

Preferably, in the case that the terminal enters the access state, when determining that the preset access state condition is met based on the recorded load conditions of the bands in the section, performing, by the base station, load balancing control on the terminal, comprises: when the terminal has an air interface version number larger than or equal to 8, the terminal transmits an incall message with a ALT_BAND_CLASS_SUP equal to 1 to the base station, the source band is not as same as the target band, and both the source band and the target band are deployed in the section, determining whether the preset access condition is met; otherwise, performing a first type of load balancing control; and the determining whether the preset access condition is met comprises: when the instant load of the source band is larger than the preset load threshold of the source band, the instant load of the target band is smaller than the preset load threshold of the target band, determining that the preset access state condition is met, and performing a second type of load balancing control; otherwise, determining that the preset access state condition is not met, and performing a first type of load balancing control.

Preferably, the first type of load balancing control comprises: assigning a specific carrier frequency of the source band to the terminal; and the second type of load balancing control comprises: assigning a specific carrier frequency of the target band to the terminal.

Preferably, the load threshold of the source band is larger than the load threshold of the target band; and determining that the source band is not as same as the target band comprises: determining the target band as a band $B_t$ with a smallest traffic amount during a specific statistical period; and when $t \neq a$, determining that the source band is not as same as the target band.

Preferably, the specific carrier frequency of the target band is $$f_{tm'}, m' = \operatorname*{argmin}_{m} l_{tm};$$

the specific carrier frequency of the source band is $$f_{am'}, m' = \operatorname*{argmin}_{m} l_{am}; \quad l_{tm} = \frac{P_{tm}^{cur}}{P_{tm}^{max}}$$

is the instant load at $f_{tm}$; and $$l_{am} = \frac{P_{am}^{cur}}{P_{am}^{max}}$$

is the instant load at $f_{am}$.

Preferably, in the case that the terminal enters the service state, when determining that the preset service state condition is met based on the recorded load conditions of the bands in the section, performing, by the base station, load balancing control on the terminal, comprises: when the instant load of the source band is larger than the preset load threshold of the source band, and a specific band set is not empty, performing load balancing control on the terminal.

Preferably, the source band is a band $B_a$ in which the terminal is located after a service switch; the specific band set $S_c = S_b \cap S_q$, where $S_q$ is a set of all bands the terminal supports; $S_b = \{B_a | L_a < T_{32}\}$; and $T_{32}$ is the preset load threshold of the target band.

Preferably, the preforming load balancing control on the terminal comprises: selecting a band with a lowest load from the specific band set as the target band; selecting a carrier frequency with a lowest load in the target band as a target carrier frequency; and notifying, in a handoff indication message, the terminal to handoff to the target carrier frequency.

In another embodiment, a load balancing system for a multi-band network is provided, comprising an information recording module, an information analysis module and a load balancing control module, wherein the information recording module is configured to record load conditions of the bands in the section, when a terminal enters an idle, access or service state, and determining that the terminal is in a multi-band covering section; wherein the information analysis module is configure to determine whether the terminal is in a multi-band covering section when the terminal enters the idle, access or service state, and notify the information recording module if yes; and to notify the load balancing control module to perform load balancing control, when determining that a preset idle or access or service state condition is met based on load conditions of the bands in the section recorded by the information recording module; and wherein the load balancing control module is configured to perform load balancing control on the terminal.

Preferably, the recorded load conditions of the bands in the section comprises load conditions of source bands and target bands on which load balancing control is performed; the load conditions of source bands comprises at least instant load of the source band; and the load conditions of target bands comprises at least instant load of the target band.

Preferably, when the terminal enters the ide state, the information recording module is further configured to notify the load balancing control module to perform load balancing control, when determining that the source band is not as same as the target band, the instant load of the source band is larger than a preset load threshold of the source band, and the instant load of the target band is smaller than a preset load threshold of the target band; the load balancing control module is further configured to transmit a service redirection message, which carries a list of carrier frequencies of the source and target bands, to the terminal, so that the terminal sequentially selects each carrier frequency in the list until successfully entering a system at a selected carrier frequency.

Preferably, when the terminal enters the access state, the information recording module is further configured to determine whether the preset access condition is met, when the terminal has an air interface version number larger than or equal to 8, the terminal transmits an incall message with a ALT_BAND_CLASS_SUP equal to 1 to the base station, the source band is not as same as the target band, and both the source band and the target band are deployed in the section; otherwise, notify the load balancing control module to perform a first type of load balancing control; and the information analysis module is further configured to determine that the preset access state condition is met when the instant load of the source band is larger than the preset load threshold of the source band, the instant load of the target band is smaller than the preset load threshold of the target band, and notify the load balancing control module to perform a second type of load balancing control; otherwise, determine that the preset access state condition is not met, and notify the load balancing control module to perform a first type of load balancing control. Accordingly, the load balancing control module is further configured to perform the first type of load balancing control by assigning a specific carrier frequency of the source band to the terminal; and perform the second type of load balancing control by assigning a specific carrier frequency of the target band to the terminal.

Preferably, when the terminal enters the service state, the information recording module is further configured to notify the load balancing control module to perform load balancing control, when the instant load of the source band is larger than the preset load threshold of the source band, and a specific band; and accordingly, the load balancing control module is further configured to perform the following: selecting a band with a lowest load from the specific band set as the target band; selecting a carrier frequency with a lowest load in the target band as a target carrier frequency; and notifying, in a handoff indication message, the terminal to handoff to the target carrier frequency.

With the load balancing method and system for the multi-band network according to the embodiments of the disclosure, when a terminal enters an idle, access or service state, and a base station determines that the terminal is in a multi-band covering section, load conditions of the bands in the section are recorded; and when determining that a preset idle or access or service state condition is met based on the recorded load conditions of the bands in the section, the base station performs load balancing control on the terminal. For the terminal in the idle, access or service state, load balancing for a multi-band network can be implemented.

DETAILED DESCRIPTION

Figure 1:
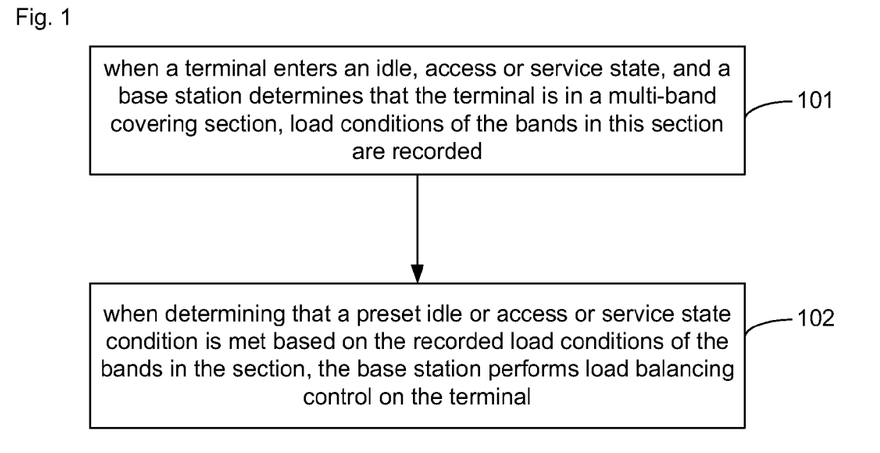
FIG. 1 is a flow chart of a load balancing method for a multi-band network according to an embodiment of the disclosure.

Referring to FIG. 1, in an embodiment of the disclosure, a load balancing method for a multi-band network is provided. The method includes the following steps.

At step 101, when a terminal enters an idle, access or service state, and a base station determines that the terminal is in a multi-band covering section, load conditions of the bands in this section are recorded.

In this embodiment, the load conditions of the bands in which the terminal is located refer mainly to load conditions of source bands and target bands on which load balancing control is performed. Preferably, the load conditions refer mainly to instant loads of the source bands and target bands.

The conditions when the terminal enters the idle, access or service state will be described briefly in the following.

1) the terminal is started and enters the idle state. When a signal from the base station is searched out, the terminal transmits a registration message to the base station. After receiving the registration message from the terminal, the base station determined whether the terminal is located in a multi-band covering section; if yes, the base station records the load conditions of the bands in the section in which the terminal is located; otherwise, the base station does not perform any load balancing processing as described in the embodiment of the disclosure.

2) the terminal initiates an access, enters the access state, and transmits a paging message to the base station. After receiving the paging message from the terminal, the base station determined whether the terminal is located in a multi-band covering section; if yes, the base station records the load conditions of the bands in the section in which the terminal is located; otherwise, the base station does not perform any load balancing processing as described in the embodiment of the disclosure.

3) if a traffic channel switch occurs after the terminal enters the service state, the base station determines whether the terminal is switched from a single-band covering section to a multi-band covering section; if yes, the base station records the load conditions of the bands in the section in which the terminal is located; otherwise, the base station does not perform any load balancing processing as described in the embodiment of the disclosure.

At step 102, when determining that a preset idle or access or service state condition is met based on the recorded load conditions of the bands in the section, the base station performs load balancing control on the terminal.

In the case that the terminal enters the idle state, when the source band is not as same as the target band, the instant load of the source band is larger than a preset load threshold of the source band, and the instant load of the target band is smaller than a preset load threshold of the target band, a load balancing control is performed on the terminal.

Preferably, the performing of the load balancing control on the terminal includes the following: the base station transmits a traffic redirect message to the terminal, the message containing the target band and a list of carrier frequencies of the target band; the terminal receives the traffic redirect message and selects each carrier frequency in the carrier frequency list, until it successfully enters the system.

In the case that the terminal enters the access state, and the base station determine that a preset access condition is met based on the recorded load condition of the bands in the section, performing load balancing control on the terminal comprises:

when the terminal has an air interface version number larger than or equal to 8, the terminal transmits an incall message with a ALT_BAND_CLASS_SUP equal to 1 to the base station, the source band is not as same as the target band, and both the source band and the target band are deployed in the section, determining whether the preset access condition is met; otherwise, performing a first type of load balancing control; and the determining whether the preset access condition is met comprises: when the instant load of the source band is larger than the preset load threshold of the source band, the instant load of the target band is smaller than the preset load threshold of the target band, determining that the preset access state condition is met, and performing a second type of load balancing control; otherwise, determining that the preset access state condition is not met, and performing a first type of load balancing control.

Further, the first type of load balancing control comprises: assigning a specific carrier frequency of the source band to the terminal; and the second type of load balancing control comprises: assigning a specific carrier frequency of the target band to the terminal.

In the case that the terminal enters the service state, and the base station determine that a preset service condition is met based on the recorded load condition of the bands in the section, performing load balancing control on the terminal comprises:

when the instant load of the source band is larger than the preset load threshold of the source band, and a specific band set is not empty, performing load balancing control on the terminal.

The performing load balancing control on the terminal comprises: selecting a band with a lowest load from the specific band set as the target band; selecting a carrier frequency with a lowest load in the target band as a target carrier frequency; and notifying, in a handoff indication message, the terminal to handoff to the target carrier frequency.

Hereinafter, specific embodiments are provided to illustrate the flow of load balancing in the three states. For convenience of description, assumptions on the carrier frequency deployments in the network and some indexes are described.

1. setting the number of bands deployed in the network to be N (i.e., the number of bands deployed in the section in which the terminal is located), where the nth band is denoted as $B_n$ ($1 \leq n \leq N$), and N is a positive integer.

2. setting the number of carrier frequencies deployed in the nth band to be $M_n$, where the mth carrier frequency in the nth band is denoted as $f_{nm}$ ($1 \leq m \leq M_n$), the rated forward transmit power at $f_{nm}$ is denoted as $P_{nm}^{max}$, and the current forward transmit power at $f_{nm}$ is denoted as $P_{nm}^{cur}$.

3. defining the instant load at $f_{nm}$ is $l_{nm}$:

$$l_{nm} = \frac{P_{nm}^{cur}}{P_{nm}^{max}}.$$

4. defining the instant load at $B_n$ is $L_n$:

$$L_n = \frac{\sum_{m=1}^{M_n} P_{nm}^{cur}}{\sum_{m=1}^{M_n} P_{nm}^{max}}.$$

In a first embodiment, when the terminal is in the idle state, the load balancing process for the multi-band network includes the following steps.

1. The terminal transmits a registration message to the base station. At this time, the band in which the terminal is located, i.e., the source band, is $B_a$ ($1 \leq a \leq N$). After the base station receives the registration message, it determines that the base station is in a multi-band covering section, and proceeds with the second step; otherwise does not perform any processing.

2. The base station confirms that the last digit of the IMSI (in a decimal format) of the terminal is z; if z∈C, proceeds with the third step; otherwise does not perform any processing; where C is a parameter preset by the network management system, is an integer set from 0 to 9, and defines a set of terminals which are subjected to the idle state load balancing.

3. The base station calculates the instant load $$L_a = \frac{\sum_{m=1}^{M_a} P_{am}^{cur}}{\sum_{m=1}^{M_a} P_{am}^{max}}$$

at $B_a$, and determines the target band $$B_t\left(t = \underset{a}{\mathrm{argmin}} L_a\right),$$

and then calculates the instant load $$L_t = \frac{\sum_{m=1}^{M_t} P_{tm}^{cur}}{\sum_{m=1}^{M_t} P_{tm}^{max}} \text{ at } B_t.$$

4. When the base station determines that the idle state conditions (all of the following three conditions) are met based on the load condition of the band in the third step, the base station proceeds with the fifth step; otherwise, does not perform any processing.

Condition 1: t≠a (i.e., the source band is not as same as the target band)

Condition 2: $L_a > T_{11}$, $T_{11}$ is a preset load threshold of the source band (i.e., the instant load of the source band is larger than a preset load threshold of the source band)

Condition 3: $L_t < T_{12}$, $T_{12}$ is a preset load threshold of the target band (i.e., the instant load of the target band is larger than a preset load threshold of the target band); where $T_{11}$, $T_{12}$ is in a unit of percentage, and $T_{11} > T_{12}$.

5. The base station transmits a service redirection message; the message carries the target band $B_t$, the channel list is a list of carrier frequencies $f_{tm}$ ($1 \leq m \leq M_t$) of $B_t$, and the carrier frequencies in the list is sorted in an ascending order of loads.

The service redirection message contains the following:

| Subfield Length | bits |
|---|---|
| BAND_CLASS | 5 |
| EXPECTED_SID | 15 |
| EXPECTED_NID | 16 |
| RESERVED | 4 |
| NUM_CHANS | 4 |
| NUM_CHANS occurrences of the following field: | |
| CDMA_CHAN | 11 |
| RESERVED | 0-7 (as needed) |

The field BAND_CLASS in the service redirection message indicates the target band to which the terminal is redirected (target band $B_t$ in this embodiment), and the message carries several carrier frequencies in this band (the number of frequencies is denoted by the field NUM_CHANS and the frequency information is included in the list CDMA_CHAN), which are $f_{tm}$ ($f_{t1}$, $f_{t2}$, $f_{t3}$ ... $f_{tM_t}$) in this embodiment.

After the terminal receives the service redirection message, it sequentially selects each carrier frequency from the listed carrier frequencies $f_{t1}$, $f_{t2}$, $f_{t3}$ ... $f_{tM_t}$ in the target band $B_t$ (sequentially selects each carrier frequency in an order listed in the carrier frequency list), until entering the system at a selected carrier frequency. For example, the base station has already sorted the $f_{t1}$, $f_{t2}$, $f_{t3}$ ... $f_{tM_t}$ in an ascending order of loads, and the terminal, according to an order of the carrier frequencies appearing in the list, initially selects $f_{t1}$ (with a lowest load, since the carrier frequencies are sorted by the base station in an ascending order of loads); if the terminal fails to enter the system at $f_{t1}$, it continues to select $f_{t2}$; if the terminal successfully enters the system at $f_{t2}$, it enters the standby state at $B_t$.

Further, the base station may specify desired SID and NID on the target band through the service redirection message, or does not specify the SID and NID (in this case, the SID/NID is equal to 0/65535); if an SID/NID of a system that the terminal searches out at a certain carrier frequency in the target band is not equal to the specified SID/NID (except 0/65535), the terminal does not enter the system, i.e., the terminal does not perform handoff and considers that the search is failed.

In a second embodiment, when the terminal is in the access state, the load balancing process for the multi-band network includes the following steps.

1. a preset parameter $B_t$ is set in the network management system. $B_t$ is a band with a minimum traffic amount during a certain statistical period, and is a constant value during the statistical period;

For an expanded system parameter message issued at carrier frequency $f_{nm}$, if n≠t, it is assumed that the field ALT_BAND_CLASS in the expanded system parameter message=$B_t$, i.e., $B_t$ is the target band.

2. The terminal enters the access state from the standby state, and transmits an incall message to the base station. At this time, the terminal is located in a band $B_a$ ($1 \leq a \leq N$), i.e., the source band. After receiving the incall message, if the base station determines that the section in which the terminal is located is a multi-band coverage section, proceeds with the third step; otherwise, does not perform any processing.

3. If the base station determines that all the four conditions are met, the base station proceeds with the fourth step; otherwise, proceeds with the fifth step (the first type of load balancing control):

Condition 1: the terminal has an air interface version number larger than or equal to 8;

Condition 2: an incall message has a field ALT_BAND_CLASS_SUP equal to 1;

Condition 3: a≠t (i.e., the source band is not as same as the target band);

Condition 4: in addition to $B_a$, $B_t$ is deployed in the section which the terminal accesses.

4. The base station calculates $L_a$ and $L_t$; if $L_a > T_{21}$ and $L_t < T_{22}$, performs the second type of load balancing control: assigning the specific carrier frequency $f_{tm'}$ of the target band to the terminal; the terminal performs handoff to $f_{tm'}$ and establishes a traffic channel on $f_{tm'}$, where $$m' = \underset{m}{\arg\min} l_{tm}, \quad l_{tm} = \frac{P_{tm}^{cur}}{P_{tm}^{max}};$$

otherwise, proceeds with the fifth step (the first type of load balancing control);

5. The first type of load balancing control: assigning the specific carrier frequency $f_{am'}$ of the source band to the terminal; the terminal performs handoff to $f_{am'}$ and establishes a traffic channel on $f_{am'}$, where $$m' = \underset{m}{\arg\min} l_{am}, \quad l_{am} = \frac{P_{am}^{cur}}{P_{am}^{max}}.$$

$T_{21}$ and $T_{22}$ are load thresholds of the source and target bands for load balancing in the access state, respectively, are taken in percentage and $T_{21} > T_{22}$.

In a third embodiment, when the terminal is in the service state, the load balancing process for the multi-band network includes the following steps.

1. the terminal performs a handoff, (a service channel handoff; in terms of coverage area, it means the handoff from the single-band coverage area to the multi-band coverage area), the terminal is in band $B_a$ after the handoff. In this embodiment, $B_a$ is the source band.

2. If at least one in the active set of the terminals before handoff is in a non multi-band coverage cell, and the active set of the terminals after handoff are within a multi-band coverage cell (i.e., the base station determines that the terminal performs handoff from a single-band coverage area to a multi-band coverage area), proceeds with the third step; otherwise, does not perform any processing.

3. The base station transmits a state inquiry request message to the terminal to inquire the bands the terminal supports and waits for a response from the terminal; meanwhile, the base station calculates $L_a$, assuming that the set $S_b = \{B_a | L_a < T_{32}\}$.

4. The terminal responds to the base station with a state inquiry response, which contains all bands the terminal supports, assuming that the set $S_q$ is all bands the terminal supports and $S_c = S_b \cap S_q$.

5. If $L_a > T_{31}$, and $S_c$ is not empty, it proceeds with the six step; otherwise, does not perform any processing.

6. The base station selects a band with a lowest load from $S_c$ as the target band $B_t$, selects a carrier frequency with a lowest load in the target band $B_t$ as a target carrier frequency, and notifies, in a handoff direction message, the terminal to handoff to the target carrier frequency.

$T_{31}$ and $T_{32}$ are parameters preset in the network management system, which are load thresholds of the source and target bands for load balancing in the service state, respectively, are taken in percentage and $T_{31}>T_{32}$.

Figure 2:
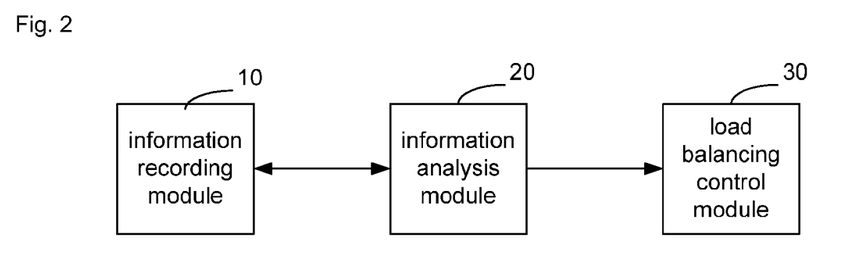
FIG. 2 is a block diagram of a load balancing system for a multi-band network according to an embodiment of the disclosure.

For implementing the above method, as shown in FIG. 2, in an embodiment, a load balancing system for a multi-band network is provided, comprising an information recording module 10, an information analysis module 20 and a load balancing control module 30.

The information recording module 10 is configured to record load conditions of the bands in the section, when a terminal enters an idle, access or service state, and determining that the terminal is in a multi-band covering section.

The information analysis module 20 is configure to determine whether the terminal is in a multi-band covering section when the terminal enters the idle, access or service state, and notify the information recording module 10 if yes; and to notify the load balancing control module 30 to perform load balancing control, when determining that a preset idle or access or service state condition is met based on load conditions of the bands in the section recorded by the information recording module; and The load balancing control module 30 is configured to perform load balancing control on the terminal.

The recorded load conditions of the bands in the section comprises load conditions of source bands and target bands on which load balancing control is performed. The load conditions of source bands comprises at least instant load of the source band; and the load conditions of target bands comprises at least instant load of the target band.

When the terminal enters the idle state, the information recording module 20 is further configured to notify the load balancing control module 30 to perform load balancing control, when determining that the source band is not as same as the target band, the instant load of the source band is larger than a preset load threshold of the source band, and the instant load of the target band is smaller than a preset load threshold of the target band; accordingly, the load balancing control module is further configured to: transmit a traffic redirection message, which carries a list of carrier frequencies of the source and target bands, to the terminal, so that the terminal sequentially selects each carrier frequency in the list until successfully entering a system at a selected carrier frequency.

When the terminal enters the access state, the information recording module 20 is further configured to determine whether the preset access condition is met, when the terminal has an air interface version number larger than or equal to 8, the terminal transmits an incall message with a ALT_BAND_CLASS_SUP equal to 1 to the base station, the source band is not as same as the target band, and both the source band and the target band are deployed in the section; otherwise, notify the load balancing control module to perform a first type of load balancing control; and the information analysis module 20 is further configured to determine that the preset access state condition is met when the instant load of the source band is larger than the preset load threshold of the source band, the instant load of the target band is smaller than the preset load threshold of the target band, and notify the load balancing control module 30 to perform a second type of load balancing control; otherwise, determine that the preset access state condition is not met, and notify the load balancing control module 30 to perform a first type of load balancing control. Accordingly, the load balancing control module is further configured to: perform the first type of load balancing control by assigning a specific carrier frequency of the source band to the terminal; and perform the second type of load balancing control by assigning a specific carrier frequency of the target band to the terminal.

When the terminal enters the service state, the information recording module 20 is further configured to notify the load balancing control module 30 to perform load balancing control, when the instant load of the source band is larger than the preset load threshold of the source band, and a specific band; and accordingly, the load balancing control module 30 is further configured to perform the following: selecting a band with a lowest load from the specific band set as the target band; selecting a carrier frequency with a lowest load in the target band as a target carrier frequency; and notifying, in a handoff indication message, the terminal to handoff to the target carrier frequency.

The above description is just preferred embodiments of the disclosure and is not intended to limit the scope of the disclosure.

The invention claimed is:

1. A load balancing method for a multi-band network, comprising:
   when a terminal enters an idle, access or service state, and a base station determines that the terminal is in a multi-band covering section, recording load conditions of the bands in the section, wherein the recorded load conditions of the bands in the section comprises load conditions of source bands and target bands on which load balancing control is performed; and
   when determining that a preset idle or access or service state condition is met based on the recorded load conditions of the bands in the section, performing, by the base station, load balancing control on the terminal;
   wherein in the case that the terminal enters the idle state, when determining that the preset idle state condition is met based on the recorded load conditions of the bands in the section, performing, by the base station, load balancing control on the terminal, comprises:
   when determining that the source band is not as same as the target band, the instant load of the source band is larger than a preset load threshold of the source band, and the instant load of the target band is smaller than a preset load threshold of the target band, performing load balancing control on the terminal;
   wherein in the case that the terminal enters the access state, when determining that the preset access state condition is met based on the recorded load conditions of the bands in the section, performing, by the base station, load balancing control on the terminal, comprises:
   when the terminal has an air interface version number larger than or equal to 8, the terminal transmits an incall message with a ALT_BAND_CLASS_SUP equal to 1 to the base station, the source band is not as same as the target band, and both the source band and the target band are deployed in the section, determining whether the preset access condition is met; otherwise, performing a first type of load balancing control; and
   wherein the determining whether the preset access condition is met comprises: when the instant load of the source band is larger than the preset load threshold of the source band, the instant load of the target band is smaller than the preset load threshold of the target band, determining that the preset access state condition is met, and performing a second type of load balancing control; otherwise, determining that the preset access state condition is not met, and performing a first type of load balancing control;

wherein in the case that the terminal enters the service state, when determining that the preset service state condition is met based on the recorded load conditions of the bands in the section, performing, by the base station, load balancing control on the terminal, comprises:

when the instant load of the source band is larger than the preset load threshold of the source band, and a specific band set is not empty, performing load balancing control on the terminal.

2. The load balancing method for the multi-band network according to claim 1, wherein
the load conditions of source bands comprises at least instant load $$L_a = \frac{\sum_{m=1}^{M_a} P_{am}^{cur}}{\sum_{m=1}^{M_a} P_{am}^{max}}$$

of the source bands $B_a$, where $1 \leq a \leq N$, N denotes a number of bands deployed in the section and is a positive integer; $P_{am}^{cur}$ denotes a current forward transmit power at $f_{am}$; $P_{am}^{max}$ denotes a rated forward transmit power at $f_{am}$; $f_{am}$ is a $m^{th}$ carrier frequency in $B_a$, $1 \leq m \leq M_a$; $M_a$ denotes a number of carrier frequencies deployed in $B_a$;

the load conditions of target bands comprises at least instant load $$L_t = \frac{\sum_{m=1}^{M_t} P_{tm}^{cur}}{\sum_{m=1}^{M_t} P_{tm}^{max}}$$

of the target bands $B_t$, where $P_{tm}^{cur}$ denotes a current forward transmit power at $f_{tm}$; $P_{tm}^{max}$ denotes a rated forward transmit power at $f_{tm}$; $f_{tm}$ is a $m^{th}$ carrier frequency in band $B_t$, $1 \leq m \leq M_t$; $M_t$ denotes a number of carrier frequencies deployed in band $B_t$, and is a positive integer.

3. The load balancing method for the multi-band network according to claim 1, wherein
the load threshold of the source band is larger than the load threshold of the target band; and
determining that the source band is not as same as the target band comprises:
determining that the target band hen is $B_t$ based on the source band $B_a$, where $$t = \arg\min_a L_a;$$

and when $t \neq a$, determining that the source band is not as same as the target band.

4. The load balancing method for the multi-band network according to claim 1, wherein the preforming load balancing control on the terminal comprises:
transmitting, by the base station, a traffic redirection message, which carries a list of carrier frequencies of the source and target bands, to the terminal;
after receiving the traffic redirection message, sequentially selecting each carrier frequency in the list, until successfully entering a system at a selected carrier frequency.

5. The load balancing method for the multi-band network according to claim 1, wherein
The first type of load balancing control comprises: assigning a specific carrier frequency of the source band to the terminal; and
The second type of load balancing control comprises: assigning a specific carrier frequency of the target band to the terminal.

6. The load balancing method for the multi-band network according to claim 1, wherein
the load threshold of the source band is larger than the load threshold of the target band; and
determining that the source band is not as same as the target band comprises:
determining the target band as a band $B_t$ with a smallest traffic amount during a specific statistical period; and when $t \neq a$, determining that the source band is not as same as the target band.

7. The load balancing method for the multi-band network according to claim 5, wherein
the specific carrier frequency of the target band is $f_{tm'}$, $$m' = \arg\min_m l_{tm};$$

the specific carrier frequency of the source band is $f_{am'}$, $$m' = \arg\min_m l_{am}; l_{tm} = \frac{P_{tm}^{cur}}{P_{tm}^{max}}$$

is the instant load at $f_{tm}$; and $$l_{am} = \frac{P_{am}^{cur}}{P_{am}^{max}}$$

is the instant load at $f_{am}$.

8. The load balancing method for the multi-band network according to claim 1, wherein the source band is a band $B_a$ in which the terminal is located after a service switch;
the specific band set $S_c = S_b \cap S_q$, where $S_q$ is a set of all bands the terminal supports; $S_b = \{B_a | L_a < T_{32}\}$; and $T_{32}$ is the preset load threshold of the target band.

9. The load balancing method for the multi-band network according to claim 8, wherein the performing load balancing control on the terminal comprises:
selecting a band with a lowest load from the specific band set as the target band; selecting a carrier frequency with a lowest load in the target band as a target carrier frequency; and notifying, in a handoff indication message, the terminal to handoff to the target carrier frequency.

10. A load balancing system for a multi-band network, comprising an information recording module, an information analysis module and a load balancing control module, wherein the information recording module is configured to record load conditions of the bands in the section, when a terminal enters an idle, access or service state, and determining that the terminal is in a multi-band covering section, wherein the recorded load conditions of the bands in the section comprises load conditions of source bands and target bands on which load balancing control is performed, and wherein the load conditions of source bands comprises at least instant load of the source band, and the load conditions of target bands comprises at least instant load of the target band;

wherein the information analysis module is configure to determine whether the terminal is in a multi-band covering section when the terminal enters the idle, access or service state, and notify the information recording module if yes; and to notify the load balancing control module to perform load balancing control, when determining that a preset idle or access or service state condition is met based on load conditions of the bands in the section recorded by the information recording module; and wherein the load balancing control module is configured to perform load balancing control on the terminal;

wherein when the terminal enters the idle state, the information recording module is further configured to notify the load balancing control module to perform load balancing control, when determining that the source band is not as same as the target band, the instant load of the source band is larger than a preset load threshold of the source band, and the instant load of the target band is smaller than a preset load threshold of the target band;

when the terminal enters the access state, the information recording module is further configured to determine whether the preset access condition is met, when the terminal has an air interface version number larger than or equal to 8, the terminal transmits an incall message with a ALT_BAND_CLASS_SUP equal to 1 to the base station, the source band is not as same as the target band, and both the source band and the target band are deployed in the section; otherwise, notify the load balancing control module to perform a first type of load balancing control; and the information analysis module is further configured to determine that the preset access state condition is met when the instant load of the source band is larger than the preset load threshold of the source band, the instant load of the target band is smaller than the preset load threshold of the target band, and notify the load balancing control module to perform a second type of load balancing control; otherwise, determine that the preset access state condition is not met, and notify the load balancing control module to perform a first type of load balancing control;

when the terminal enters the service state, the information recording module is further configured to notify the load balancing control module to perform load balancing control, when the instant load of the source band is larger than the preset load threshold of the source band, and a specific band.

11. The load balancing system for the multi-band network according to claim 10, wherein the load conditions of source bands comprises at least instant load of the source band; and the load conditions of target bands comprises at least instant load of the target band.

12. The load balancing system for the multi-band network according to claim 11, wherein when the terminal enters the idle state, the load balancing control module is further configured to transmit a traffic redirection message, which carries a list of carrier frequencies of the source and target bands, to the terminal, so that the terminal sequentially selects each carrier frequency in the list until successfully entering a system at a selected carrier frequency.

13. The load balancing system for the multi-band network according to claim 11, wherein when the terminal enters the access state, the load balancing control module is further configured to perform the first type of load balancing control by assigning a specific carrier frequency of the source band to the terminal; and perform the second type of load balancing control by assigning a specific carrier frequency of the target band to the terminal.

14. The load balancing system for the multi-band network according to claim 11, wherein when the terminal enters the service state, the load balancing control module is further configured to perform the following: selecting a band with a lowest load from the specific band set as the target band; selecting a carrier frequency with a lowest load in the target band as a target carrier frequency; and notifying, in a handoff indication message, the terminal to handoff to the target carrier frequency.

15. The load balancing method for the multi-band network according to claim 3, wherein the preforming load balancing control on the terminal comprises:

transmitting, by the base station, a traffic redirection message, which carries a list of carrier frequencies of the source and target bands, to the terminal;

after receiving the traffic redirection message, sequentially selecting each carrier frequency in the list, until successfully entering a system at a selected carrier frequency.

16. The load balancing method for the multi-band network according to claim 6, wherein the specific carrier frequency of the target band is $f_{tm'}$, $$m' = \underset{m}{\operatorname{argmin}} l_{tm};$$

the specific carrier frequency of the source band is $f_{am'}$, $$m' = \underset{m}{\operatorname{argmin}} l_{am}; l_{tm} = \frac{P_{tm}^{cur}}{P_{tm}^{max}}$$

is the instant load at $f_{tm}$; and $$l_{am} = \frac{P_{am}^{cur}}{P_{am}^{max}}$$

is the instant load at $f_{am}$.

* * * * *